Patented Aug. 3, 1937

2,088,712

UNITED STATES PATENT OFFICE 2,088,712

CHILLPROOFING COMPOUND

Henry E. Melton, Detroit, Mich., assignor to C. E. Jamieson & Company, Detroit, Mich., a corporation of Michigan No Drawing. Application November 23, 1933, Serial No. 699,465. Renewed January 16, 1937

14 Claims. (Cl. 99—48)

The invention relates to the manufacture of malt beverages such as beers and ales and more particularly to a process which makes possible the production of more stable beverages capable of being chilled for considerable periods without becoming turbid or cloudy. The clouding of beers is due principally to albuminoids and proteids but is sometimes also due to other principles which come from the hops and malt.

The primary object of my invention is the provision of an improved chill proofing composition by means of which the malt beverage may be treated during its manufacture in order to render the final product resistant to clouding under low temperature conditions.

In the present state of the art it is known that certain chill proofing effects may be obtained by adding to beer during its manufacture certain proteolytic enzymes. I have discovered, however, that a much better chill proofing composition may be obtained by utilizing either with or without proteolytic enzymes certain chemical materials which may be classified generally as the salts of weak acids or more specifically as the alkaline salts of certain weak acids. The preferred material coming within the purview of the invention is sodium citrate because I have discovered that even when this material is used alone it greatly aids in the chill proofing of beer and it is also a desirable product because it is an entirely harmless compound not in any way affecting the food value of beers and ales.

In the broader phases of the invention it is contemplated that certain other equivalent compounds may be used as chill proofing agents either with or without the proteolytic enzymes. For example, any other water soluble citrate which is suitable for human consumption may be utilized but preferably only such compounds as have an alkaline reaction. Other examples of compounds coming within the scope of my invention are alkaline tartrates and malates.

In preparing my improved chill proofing composition for commercial use I preferably use both a proteolytic enzyme and sodium citrate or equivalent substance and the proportions are ordinarily kept between the ratio of five to one and two to one. I also preferably incorporate with this mixture a suitable diluent for increasing the bulk, and any inert material not incompatible with the ingredients of the beer may be used for this purpose. The preferred diluent is powdered sugar, free from starch. The following formula gives a specific example of one preferred composition:

| | | | |
|---|---|---|---|
| Papain (of high digestive activity) | 2-lb. | 4 oz. | 420 grains |
| Sodium citrate | | 10 oz. | 35 grains |
| Powdered sugar (without starch) | 7-lb. | 5 oz. | 183 grains |

Preferably 2 pounds of the above mixture are added to each 100 barrels of beer (each barrel holding 31 gallons). The above chill proofing composition may be added at any suitable stage prior to the final filtration and pasteurization of the beer, the exact time of incorporation depending upon the individual preference of the brew master. In general, however, it may be said that the chill proofing composition is added to the beer after the cooling of the wort and after the primary filtration has been conducted. It is important that the pasteurization of the beer following the addition of the chill proofing compound be done within a temperature range of 55° to 57° C., although it should be distinctly understood that my invention is not predicated on the maintenance of this exact temperature range.

While the formula given above produces a good chill proofing composition, it is possible to vary the proportions of the ingredients from the specific amounts given and in general it may be said that the papain may range between 2 and 2½ pounds, while the citrate is maintained between ½ and 1 pound. The diluent may be used in any desired quantity.

Among the various proteolytic enzymes which may be incorporated with sodium citrate or equivalent substance according to my invention are papain, pepsin, bromelin, the proteolytic enzyme from yeast or any other suitable enzyme that is active in acid or alkali media.

From the above it will appear that I have made available for commercial use an improved chill proofing composition having great utility in the manufacture of malt beverages.

One of the advantages of my improved composition is that it shortens the time required for chill proofing the beverage by as much as 50%. Another advantage is that the alkaline-citrate reacts to aid the proteolytic enzyme to dissolve in the beverage without causing excessive cloudiness. Thus it will be apparent that my chill proofing composition expedites and improves the chill proofing process.

Citric, tartaric and malic acids belong to a class known as "fruity acids", and any member of this class is suitable for use in my improved process.

What I claim as my invention is:

1. A composition for chill proofing malt beverages comprising a proteolytic enzyme and a water-soluble alkaline salt of a weak acid of the class known as fruity acids and consisting of citric, malic and tartaric acids.

2. A composition for chill proofing malt beverages comprising a proteolytic enzyme and an alkaline citrate.

3. A composition for chill proofing malt beverages comprising a proteolytic enzyme and sodium citrate.

4. A composition for chill proofing malt beverages comprising papain and sodium citrate.

5. A composition for chill proofing malt beverages comprising a proteolytic enzyme and an alkaline citrate in a ratio of 2 to 5 parts of the enzyme to 1 part of the alkaline citrate.

6. In the manufacture of malt beverage including the steps of cooling the wort and pasteurization, the step of adding to the said beverage subsequent to the cooling of the wort and before pasteurization a proteolytic enzyme active in acid or alkaline media and sodium citrate.

7. The process of chill proofing malt beverages comprising adding to the beverage a water soluble alkaline salt of a weak acid of the class consisting of citric, malic and tartaric acids.

8. A composition for chill proofing malt beverages comprising a proteolytic enzyme and a water-soluble alkaline salt of malic acid.

9. A composition for chill proofing malt beverages comprising a proteolytic enzyme and a water-soluble alkaline salt of tartaric acid.

10. The process of treating malt beverage to render insoluble albuminoids soluble, comprising the adding to the beverage a proteolytic enzyme and a water soluble alkaline salt, of a weak acid of the class known as fruity acids and consisting of citric, malic and tartaric acids.

11. The process of treating malt beverage to render insoluble albuminoids soluble comprising the adding to the beverage a proteolytic enzyme and a water soluble alkaline citrate.

12. The process of treating malt beverage to render insoluble albuminoids soluble comprising the adding to the beverage a proteolytic enzyme and a water soluble alkaline malate.

13. The process of treating malt beverage to render insoluble albuminoids soluble comprising the adding to the beverage a proteolytic enzyme and a water soluble alkaline tartrate.

14. A composition for chill proofing malt beverages comprising papain, 2 to 2½ pounds; sodium citrate, ½ to 1 pound.

HENRY E. MELTON.